United States Patent
Richard

(10) Patent No.: US 11,529,551 B2
(45) Date of Patent: Dec. 20, 2022

(54) METHOD OF MANUFACTURING AN ARTIFICIAL CLIMBING STRUCTURE

(71) Applicant: MASAI, Grenoble (FR)

(72) Inventor: Antoine Richard, Grenoble (FR)

(73) Assignee: MASAI, Grenoble (FR)

( * ) Notice: Subject to any disclaimer, the term of this patent is extended or adjusted under 35 U.S.C. 154(b) by 13 days.

(21) Appl. No.: 16/776,169

(22) Filed: Jan. 29, 2020

(65) Prior Publication Data

US 2020/0238144 A1    Jul. 30, 2020

(30) Foreign Application Priority Data

Jan. 30, 2019 (FR) ...................... 1900867

(51) Int. Cl.
*A63B 69/00* (2006.01)
*F16B 37/12* (2006.01)

(52) U.S. Cl.
CPC ........ *A63B 69/0048* (2013.01); *F16B 37/122* (2013.01)

(58) Field of Classification Search
CPC .................................. A63B 69/0048
See application file for complete search history.

(56) References Cited

U.S. PATENT DOCUMENTS 6,083,142 A * 7/2000 Wilson ............... A63B 69/0048
280/DIG. 8
8,038,581 B1 * 10/2011 Sudeith .................. A63B 71/06
482/37
2002/0022552 A1 2/2002 Yoshida et al.
2006/0116244 A1 * 6/2006 Postma .............. A63B 69/0048
482/37
2015/0343288 A1 * 12/2015 Taggart .............. A63B 69/0048
482/37
2018/0353823 A1 * 12/2018 Resnicke ........... A63B 69/0048

FOREIGN PATENT DOCUMENTS

DE    9317804 U1    3/1994
FR    2596658 A1    10/1987

OTHER PUBLICATIONS

European Extended Search Report and Opinion for European Application No. 20153880, dated Mar. 17, 2020, 18 pages with English translation.
French Preliminary Search Report for Application No. FR1900867, dated Sep. 24, 2019, 11 pages.

* cited by examiner

*Primary Examiner* — Jennifer Robertson
(74) *Attorney, Agent, or Firm* — TraskBritt

(57) ABSTRACT

A method for manufacturing an artificial climbing structure comprises:
  a) providing a framework, suitable for supporting the artificial climbing structure;
  b) mounting at least one structural panel on the framework;
  c) providing at least one covering panel, comprising patterns;
  d) mounting the covering panel on the structural panel in a removable manner;
  e) mounting at least one climbing hold on the covering panel; and
  f) fixing the climbing hold to the structural panel, through the covering panel, and in a removable manner.

10 Claims, 3 Drawing Sheets ized before the step $c_{02}$).

METHOD OF MANUFACTURING AN ARTIFICIAL CLIMBING STRUCTURE

PRIORITY CLAIM

This application claims the benefit of the filing date of French Patent Application Serial No. FR1900867, filed Jan. 30, 2019, for "Method for Manufacturing an Artificial Climbing Structure."

TECHNICAL FIELD

The present disclosure relates to the technical field of artificial climbing structures (ACS), also called climbing walls.

The present disclosure is notably applicable in school, sport and fun (fun climbing) contexts.

BACKGROUND

A method for manufacturing an artificial climbing structure, known from the state of the art comprises the steps of:
- $A_0$) providing a framework, suitable for supporting the artificial climbing structure;
- $B_0$) mounting at least one structural panel, comprising patterns, on the framework; and
- $C_0$) mounting at least one climbing hold on the structural panel in a removable manner.

The structural panel or panels define a climbing surface, or surface to be climbed by hand. The patterns are ornamental patterns, conventionally painted on the structural panel or panels, and defining the decoration and the theme of the artificial climbing structure. The climbing holds are removably mounted on the structural panel or panels so as to easily modify the climbing routes.

Such a method from the state of the art is not entirely satisfactory inasmuch as changing the decoration and the theme results in the replacement of the structural panels, and therefore high costs of removal, replacement and transportation. Indeed, only the framework remains in place.

BRIEF SUMMARY

Embodiments of the present disclosure aim to wholly or partly remedy the abovementioned drawbacks. To this end, the subject of the present disclosure is a method for manufacturing an artificial climbing structure, comprising the steps of:
- a) providing a framework, suitable for supporting the artificial climbing structure;
- b) mounting at least one structural panel on the framework;
- c) providing at least one covering panel, comprising patterns;
- d) mounting the covering panel on the structural panel in a removable manner;
- e) mounting at least one climbing hold on the covering panel; and
- f) fixing the climbing hold to the structural panel, through the covering panel, and in a removable manner.

Thus, such a method according to the present disclosure makes it possible to dissociate the patterns from the structural panel or panels. Changing the decoration and the theme is done by replacing the covering panel or panels; the framework and the structural panel or panels remaining in place. In other words, the decoration and the theme are changed by replacing only the covering panel or panels. A covering panel is much thinner and lighter—and therefore easier to handle—than a structural panel. The costs of removal, replacement and transportation are consequently greatly reduced. It is therefore easier to regularly put in place new themes and new routes in the climbing rooms.

Definitions

"Framework" is understood to mean all the elements forming a frame that makes it possible to support the structural panel or panels, and thereby the artificial climbing structure. For operation in France, the framework must satisfy the properties mentioned in the French standard NF EN 12572.

"Structural panel" is understood to mean a structural element that notably makes it possible to support the weight of a climber. The structural panel or panels define the climbing surface. For operation in France, the structural panel or panels must satisfy the properties mentioned in the French standard NF EN 12572.

"Covering panel" is understood to mean a facing element, of small weight relative to a structural panel.

"Patterns" are understood to mean visual elements forming graphic representations.

"Climbing hold" is understood to mean any type of artificial climbing hold such as jugs, flats, pockets, pinch grips, small edges or even climbing volumes.

The method according to the present disclosure can comprise one or more of the following features.

According to a feature of the present disclosure, the step c) is executed such that the patterns are printed on the covering panel.

"Printed" is understood to mean patterns reproduced by any printing technique, for example an ink printing technique, a toner printing technique, or even a screen-printing technique.

Thus, one advantage provided by the printed patterns is to be able to easily standardize the climbing routes, by recording them previously by digital means, which can be advantageous notably for creating inter-room challenges or reproducing routes opened by known climbers.

According to a feature of the present disclosure, the step c) is executed such that the printed patterns comprise:
- first patterns, arranged to adorn the covering panel; and
- second patterns, arranged to indicate a support surface for each climbing hold.

Thus, an advantage obtained by the second patterns is to facilitate the work of the fitters, who are not necessarily skilled in climbing.

According to a feature of the present disclosure, the step c) is preceded by steps of:
- $c_{01}$) taking at least one digital photograph of an open climbing route on a climbing wall;
- $c_{02}$) defining the second patterns to be printed on the basis of the digital photograph; and
- $c_{03}$) printing the second patterns defined on the covering panel.

Thus, one advantage that is obtained is the ease with which the second patterns are obtained from a "test" climbing wall.

According to a feature of the present disclosure, the digital photograph is orthorectified before the step $c_{02}$).

Thus, one advantage that is obtained is to be able to geometrically correct the deformations due to perspective and relief.

According to a feature of the present disclosure, the step $c_{01}$) is preceded by a step of providing the climbing wall with markers, preferably a grid.

Thus, one advantage that is obtained is to be able to facilitate the orthorectification of the digital photograph taken in the step $c_{01}$).

According to a feature of the present disclosure, the step c) is preceded by steps of:
- $c'_{01}$) scanning in three dimensions an open climbing route on a climbing wall;
- $c'_{02}$) defining the second patterns to be printed on the basis of the scanned climbing route; and
- $c'_{03}$) printing the second patterns defined on the covering panel.

Thus, one advantage that is obtained is to be able to obtain the second patterns through CAD (computer-aided design).

According to a feature of the present disclosure, the covering panel provided in the step c) is produced in a material selected from among a self-adhesive paper, a wood, aluminum, polyvinyl chloride, a composite aluminum.

According to a feature of the present disclosure, the framework is produced in a material selected from among a wood and a metal material.

According to a feature of the present disclosure, the structural panel is produced in a material selected from among a wood and a composite material.

According to a feature of the present disclosure, the method comprises a step of providing the structural panel with at least one threaded insert, intended to fix a climbing hold to the structural panel in a removable manner by screwing.

According to a feature of the present disclosure, the method comprises a step of providing the covering panel with at least one through orifice, arranged facing the threaded insert.

Thus, one advantage that is obtained is to be able to easily fix the climbing hold or holds.

Also a subject of the present disclosure is an artificial climbing structure, comprising:
- a framework;
- at least one structural panel mounted on the framework;
- at least one covering panel, comprising patterns, and mounted on the structural panel in a removable manner; and
- at least one climbing hold, mounted on the covering panel, and fixed to the structural panel through the covering panel in a removable manner.

BRIEF DESCRIPTION OF THE DRAWINGS

Other features and advantages will become apparent from the detailed description of different embodiments of the present disclosure, the description being accompanied by examples and references to the attached drawings.

DETAILED DESCRIPTION

The elements that are identical or that ensure the same function will bear the same references for the different embodiments in the interests of simplification.

Figure 2:
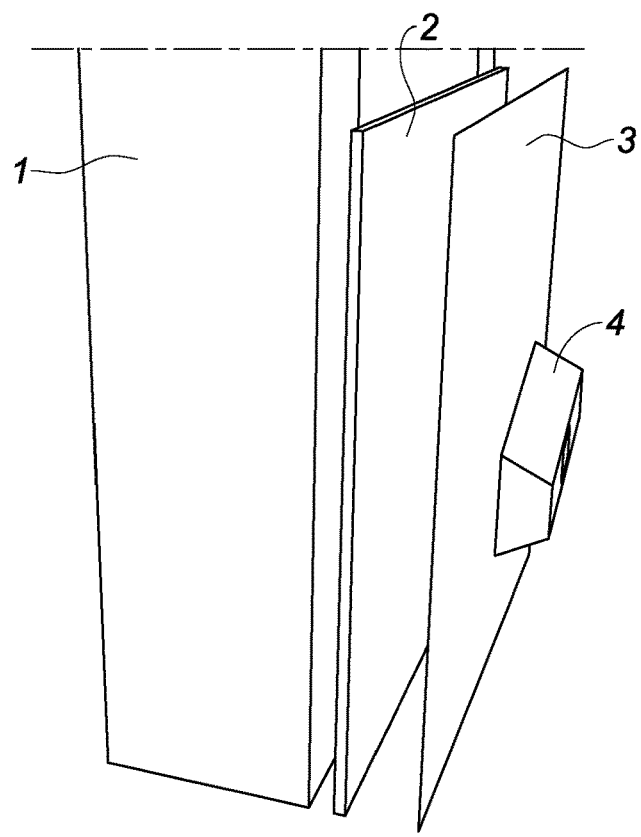
FIG. 2 is an exploded partial perspective schematic view of an artificial climbing structure according to the present disclosure.

As illustrated in FIG. 2, one subject of the present disclosure is a method for manufacturing an artificial climbing structure, comprising the steps of:
- a) providing a framework 1, suitable for supporting the artificial climbing structure;
- b) mounting at least one structural panel 2 on the framework 1;
- c) providing at least one covering panel 3, comprising patterns 30, 31 (visible in FIG. 3);
- d) mounting the covering panel 3 on the structural panel 2 in a removable manner;
- e) mounting at least one climbing hold 4 on the covering panel 3; and
- f) fixing the climbing hold 4 to the structural panel 2, through the covering panel 3, and in a removable manner.

Framework

Figure 1:
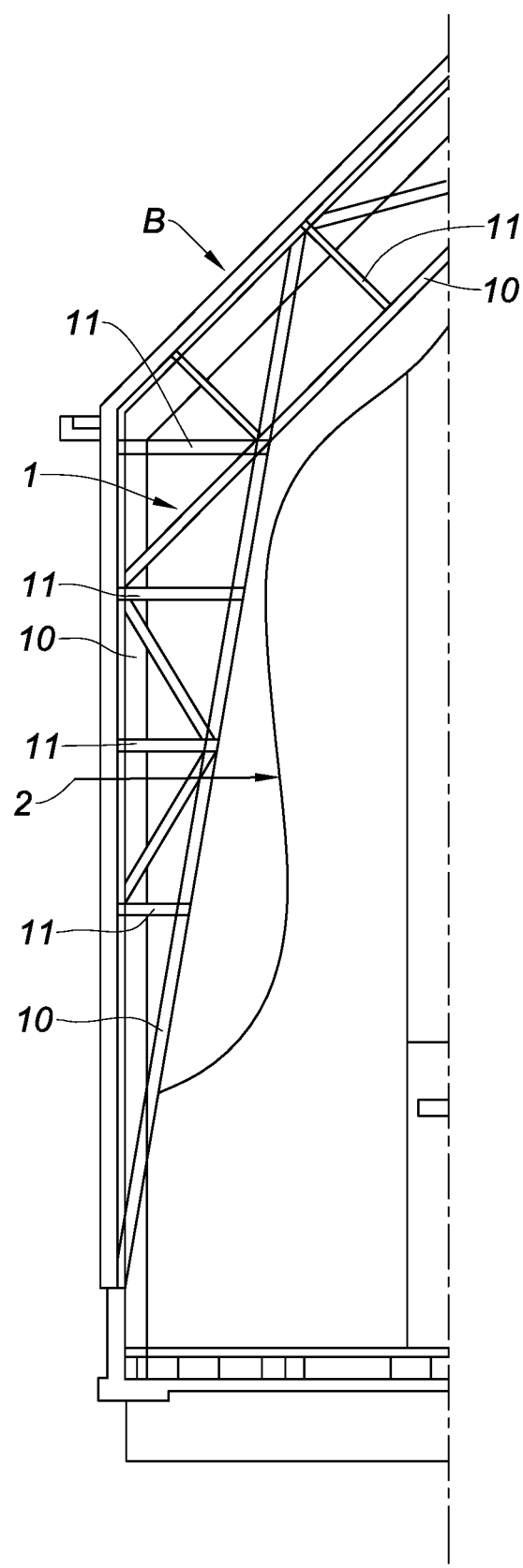
FIG. 1 is a partial schematic view in cross section of an artificial climbing structure according to the present disclosure, illustrating a framework and structural panels. The covering panel or panels and the climbing holds are not represented.

The framework 1 is advantageously produced in a material selected from among a wood and a metal material. As illustrated in FIG. 1, the framework 1 can comprise a set of uprights 10 and of cross-members 11 arranged to support the artificial climbing structure. The framework 1 can be self-supporting. As a variant, the framework 1 can be fixed to a frame B. As an example, the frame B can be a room of an establishment.

Structural Panel or Panels

The or each structural panel 2 is advantageously produced in a material selected from among a wood and a composite material. The composite material is preferentially produced from a polyester resin. The structural panel or panels 2 advantageously have a flat or dished surface. The structural panel or panels 2 and the framework 1 confer a mechanical strength on the artificial climbing structure. The structural panel or panels 2 define the climbing surface.

The method advantageously comprises a step of providing the structural panel 2 with at least one threaded insert (not illustrated), intended to fix a climbing hold 4 to the structural panel 2 in a removable manner by screwing.

Covering Panel or Panels

The covering panel 3 provided in the step c) is advantageously produced in a material selected from among a self-adhesive paper, a wood, aluminum, polyvinyl chloride, composite aluminum. As a nonlimiting example, the composite aluminum can be DIBOND®. The material in which the covering panel 3 is produced is advantageously adapted to allow printing on the covering panel 3. The material in which the covering panel 3 is produced is light relative to the material in which the structural panel 2 is produced. The material in which the covering panel 3 is produced is preferably easily machinable. The covering panel or panels 3 advantageously have a flat or dished surface. A covering panel 3 is advantageously associated with a structural panel 2. The covering panel 3 advantageously has a surface whose area is equal to the area of the surface of the structural panel 2. The term "equal" is understood to mean within the usual tolerances associated with experimental manufacturing conditions, and not perfectly equal in the mathematical sense of the term. The covering panel 3 is advantageously conformed (i.e., geometrically conformed) to cover the structural panel 2. In other words, the surface of the covering panel 3 is advantageously conformed to cover the surface of the structural panel 2. The surface of the covering panel 3 can wholly or partly cover the surface of the structural panel 2 in that the surface of the covering panel 3 covers at least 50%, preferably at least 80%, more preferably at least 90% of the surface of the structural panel 2. The covering panel 3 advantageously has a quadrangular longitudinal section, preferably rectangular or square. "Longitudinal section" is understood to mean a section extending height wise in the artificial climbing structure. The covering panel 3 can have a triangular longitudinal section.

The covering panel or panels 3 have a total surface forming a decorative surface defining the décor and the theme of the artificial climbing structure. In the state of the art, this function is ensured by the structural panel or panels 2.

The step c) is advantageously executed such that the patterns 30, 31 are mechanically secured to the covering panel 3. The step c) is advantageously executed such that the patterns 30, 31 are printed on the covering panel 3. The patterns 30, 31 are advantageously printed directly on the covering panel 3.

Figure 3:
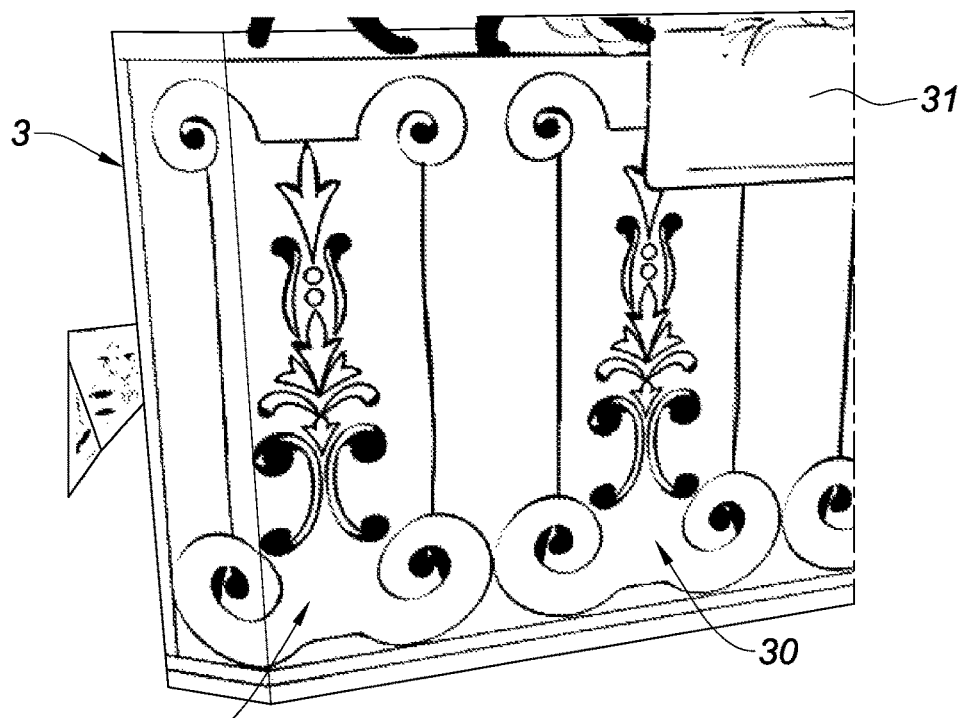
FIG. 3 is a perspective schematic view of a covering panel for an artificial climbing structure according to the present disclosure.

As illustrated in FIG. 3, the step c) is advantageously executed such that the printed patterns 30, 31 comprise:
first patterns 30, arranged to adorn the covering panel 3; and
second patterns 31, arranged to indicate a support plane for each climbing hold 4.

The first patterns 30 can take account of the support plane of each climbing hold 4 in order for them to be incorporated in the scenography. As nonlimiting examples, the second patterns 31 can comprise a numbering of the climbing holds 4, or even a nomenclature, giving an angle and a number to each climbing hold 4.

According to a first implementation, the step c) is preceded by steps of:
$c_{01}$) taking at least one digital photograph of an open climbing route V on a climbing wall M (illustrated in FIG. 4a);
$c_{02}$) defining the second patterns 31 to be printed on the basis of the digital photograph; and
$c_{03}$) printing the second patterns 31 defined on the covering panel 3.

Figures 4A, 4B:
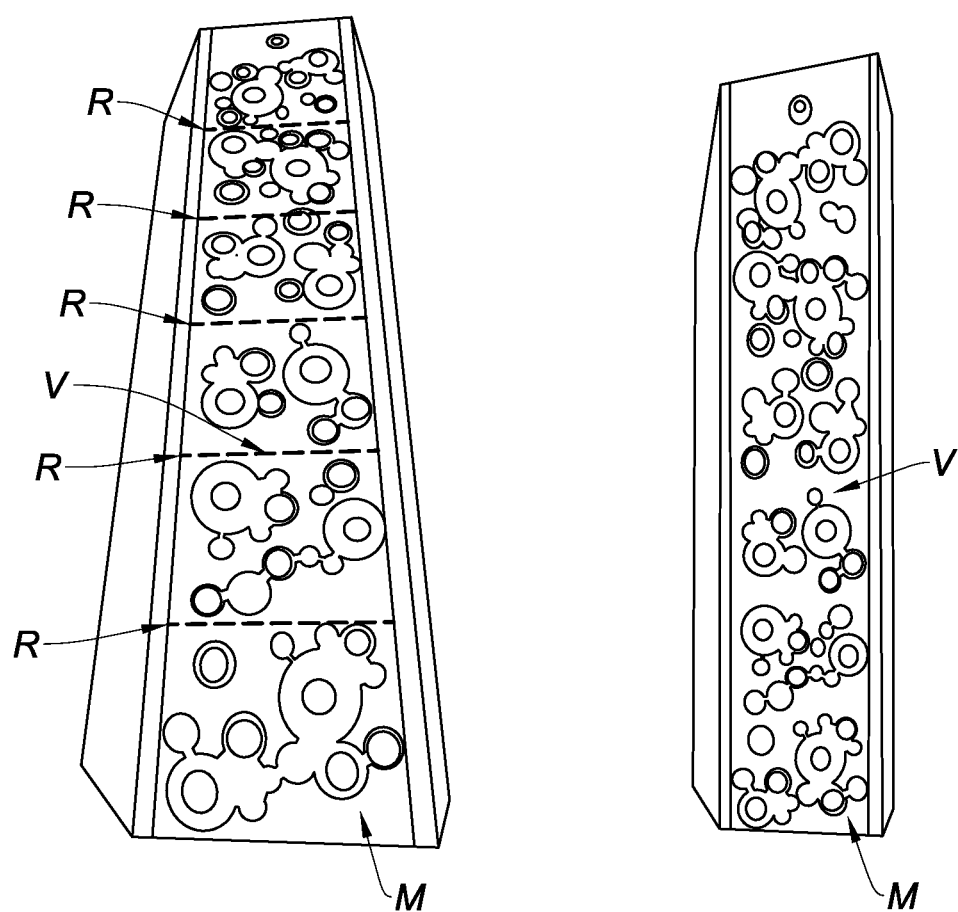
FIG. 4a illustrates a digital photograph of an open climbing route on a climbing wall.
FIG. 4b illustrates the digital photograph orthorectified.

The digital photograph taken in the step $c_{01}$) is advantageously a front photograph of the climbing route V. It is also possible to take several digital photographs of the climbing route V with different shooting angles. The digital photograph taken in the step $c_{01}$) is advantageously orthorectified before the step $c_{02}$). The orthorectification of the digital photograph can be implemented by computer. As illustrated in FIG. 4b, the orthorectification allows for a plane rectification. The step $c_{01}$) is advantageously preceded by a step of providing the climbing wall with markers R, preferably a grid. The markers R can be dotted lines.

According to a second implementation, the step c) is preceded by steps of:
$c'_{01}$) scanning in three dimensions an open climbing route V on a climbing wall M;
$c'_{02}$) defining the second patterns 31 to be printed on the basis of the scanned climbing route V; and
$c'_{03}$) printing the second patterns 31 defined on the covering panel 3.

The method advantageously comprises a step of providing the covering panel 3 with at least one through orifice (not illustrated), arranged facing the threaded insert. The covering panel or panels 3 can be pre-drilled in order to facilitate the subsequent mounting of the climbing holds 4 on the threaded inserts.

The covering panel or panels 3 are advantageously removably mounted on the structural panel or panels 2 by screwing.

Artificial Climbing Structure

One subject of the present disclosure is an artificial climbing structure, comprising:
a framework 1;
at least one structural panel 2 mounted on the framework 1;
at least one covering panel 3, comprising patterns 30, 31, and mounted on the structural panel 2 in a removable manner; and
at least one climbing hold 4, mounted on the covering panel 3, and fixed to the structural panel 2 through the covering panel 3 in a removable manner.

The present disclosure is not limited to the embodiments explained. The person skilled in the art is able to consider the technically operative combinations thereof, and replace them with equivalents.

The invention claimed is:

1. A method for manufacturing an artificial climbing structure, the method comprising:
providing a framework adapted to support the artificial climbing structure;
mounting at least one structural panel on the framework;
providing at least one covering panel comprising patterns printed on the at least one covering panel;
removably mounting the at least one covering panel on the at least one structural panel;
mounting at least one climbing hold directly on the at least one covering panel; and
removably fixing the at least one climbing hold to the at least one structural panel through the at least one covering panel,
wherein the patterns printed on the at least one covering panel comprise:
first patterns arranged to adorn the at least one covering panel; and
second patterns arranged to indicate a support surface for each of the at least one climbing hold,
the method further comprising, before providing the at least one covering panel comprising the patterns printed on the at least one covering panel:
scanning, in three dimensions, a climbing route on a climbing wall;
defining, based on the scanned climbing route, the second patterns to be printed; and
printing the second patterns on the at least one covering panel.

2. The method of claim 1, wherein providing the at least one covering panel comprising the patterns comprises:
providing the at least one covering panel formed from a material selected from self-adhesive paper, wood, aluminum, polyvinyl chloride, or composite aluminum.

3. The method of claim 1, wherein providing the framework comprises:
providing the framework formed of a material selected from a wood or a metal material.

4. The method of claim 1, wherein mounting the at least one structural panel on the framework comprises:
mounting, on the framework, the at least one structural panel formed from a material selected from a wood or a composite material.

5. The method of claim 1, further comprising providing the at least one structural panel with at least one threaded insert for removably fixing, by screwing, the at least one climbing hold to the at least one structural panel.

6. The method of claim 5, further comprising providing the at least one covering panel with at least one through hole facing the at least one threaded insert.

7. A method for manufacturing an artificial climbing structure, the method comprising:
providing a framework adapted to support the artificial climbing structure;
mounting at least one structural panel on the framework;
providing at least one covering panel comprising patterns printed on the at least one covering panel, the patterns comprising:
first patterns arranged to adorn the at least one covering panel; and
second patterns arranged to indicate a support surface for each of at least one climbing hold;
removably mounting the at least one covering panel on the at least one structural panel;
mounting the at least one climbing hold on the at least one covering panel;
removably fixing the at least one climbing hold to the at least one structural panel through the at least one covering panel; and
before providing the at least one covering panel comprising the patterns printed on the at least one covering panel:
taking at least one digital photograph of a climbing route on a climbing wall;
defining, based on the at least one digital photograph, the second patterns to be printed; and
printing the second patterns on the at least one covering panel.

8. The method of claim 7, wherein the digital photograph is orthorectified before defining the second patterns.

9. The method of claim 7, further comprising, before taking the at least one digital photograph:
providing the climbing wall with markers.

10. The method of claim 9, wherein providing the climbing wall with the markers comprises:
providing the climbing wall with a grid.

* * * * *